United States Patent [19]

Giannelis et al.

[11] Patent Number: 5,032,547

[45] Date of Patent: Jul. 16, 1991

[54] ORGANIC-INORGANIC COMPOSITES

[75] Inventors: Emmanuel P. Giannelis; Vivek Mehrota, both of Ithaca, N.Y.

[73] Assignee: Cornell Research Foundation, Inc., Ithica, N.Y.

[21] Appl. No.: 486,335

[22] Filed: Feb. 28, 1990

[51] Int. Cl.$^5$ .......................... C03C 10/16; H01B 1/06
[52] U.S. Cl. ............................................. 501/3; 501/4; 501/32; 252/500; 252/512; 252/513; 252/518; 252/521
[58] Field of Search ................. 501/3, 4, 32; 252/500, 252/512, 513, 518, 521

[56] References Cited

U.S. PATENT DOCUMENTS

| | | | |
|---|---|---|---|
| 4,239,519 | 12/1980 | Beall et al. | 501/4 |
| 4,339,540 | 7/1982 | Beall et al. | 501/3 |
| 4,454,237 | 6/1984 | Hoda et al. | 501/4 |
| 4,455,382 | 6/1984 | Wu | 501/4 |

Primary Examiner—Mark L. Bell
Assistant Examiner—Deborah Jones
Attorney, Agent, or Firm—Jones, Tullar & Cooper

[57] ABSTRACT

This invention is principally directed to the production of an organic-inorganic composite body demonstrating electrical insulating behavior consisting essentially of lithium and/or sodium water-swelling mica crystals selected from the group of fluorhectorite, hydroxyl hectorite, boron fluorphlogopite, hydroxyl boron phlogopite, and solid solutions among those and between those and other structurally-compatible species selected from the group of talc, fluortalc, polyithionite, fluorpolylithionite, phlogopite, and fluorphlogopite, wherein the $Li^+$ and/or $Na^+$ ions from the interlayer of said lithium and/or sodium water-swelling mica crystals have been exchanged with ions of a transition metal having multiple oxidation states, the galleries of said crystals containing an organic polymer exhibiting very low permittivity. The preferred organic polymer exhibiting very low permittivity is the emeraldine base form of polyaniline. Where desired, an organic-inorganic composite body can be produced wherein the galleries of the crystals contain an organic polymer exhibiting electrical conductivity, that polymer being the protonated poly(semiquinone) form of polyaniline.

14 Claims, No Drawings

ORGANIC-INORGANIC COMPOSITES

RELATED APPLICATION

Application Serial No. 07/486,457, filed concurrently herewith by the present applicants under the title ION EXCHANGED ORGANIC-INORGANIC COMPOSITES, describes the preparation of composites demonstrating electrical insulating characteristics consisting essentially of a lithium and/or sodium water-swelling mica wherein the $Li^+$ and/or $Na^+$ ions in the interlayer thereof are exchanged with a particular organic polycation.

BACKGROUND OF THE INVENTION

This invention was made in part under National Science Foundation Grant No. DMR-8818558. The United States Government has certain rights to this invention.

The evolving demands for electronic packaging of very large scale integrated circuits require increasingly severe specifications of high integration, speed, and reliability. Accordingly, new materials with low dielectric constants, coefficients of thermal expansion compatible with the semiconductor component, and high thermal conductivity have been sought in order to accommodate to the increasing switching speeds of transistors. By lowering the dielectric constant of the substrate material, the thickness of the insulating layers can be reduced without loss of impedance.

One approach taken by the art to develop such new materials has involved the use of low dielectric organic polymers such as polyimide for the insulating layers. Polyimide exhibits a high glass transition temperature with relatively good thermal stability and mechanical properties. A serious drawback of polyimide, however, resides in its coefficient of thermal expansion being an order of magnitude higher than that of the semiconductor material. Additionally, organic polymers generally lack the thermal and mechanical stability, particularly in radiation environments, intrinsic to ceramic materials. For example, efforts to replace polyimide with various fluoropolymers have not met with much success. Despite their low permittivity, their strength and modulus are prohibitively low, thereby resulting in creep under load and when subjected to environmental thermal cycling.

Recent research has been directed to the fabrication of composite bodies consisting of a combination of a ceramic material and an organic phase. The objective of such research has been to produce articles wherein the desirable properties of the organic phase would be joined with the desired properties of the ceramic material. Illustrations of that research are disclosed in U. S. Pat. No. 4,239,519 (Beall et al.), U. S. Pat. No. 4,454,237 (Hoda et al.) and U. S. Pat. No. 4,455,382 (Wu).

U. S. Pat. No. 4,239,519 describes the preparation of organic-inorganic composite bodies containing crystals of a cation exchanged lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite. In the preferred inventive embodiment the starting water-swelling mica was prepared by forming a glass-ceramic body through the heat treatment of a precursor glass body; that glass body generally consisting essentially, in weight percent, of 0–12% $Li_2O$, 0–10% $Na_2O$, 0.5–14% $Li_2O+Na_2O$, 0–30% $B_2O_3$, 10–38% MgO, 0–10% $Al_2O_3$, 35–70% $SiO_2$, 0–14% F, 0–15% OH, 4–15% F+OH, and, optionally, up to 30% total of oxides in the indicated proportions selected from the group of 0–10% CaO, 0–10% CdO, 0–10% CoO, 0–10% CuO, 0–20% FeO, 0–20% $Fe_2O_3$, 0–10% MnO, 0–10% NiO, 0–10% $P_2O_5$, 0–30% PbO, 0–20% SrO, 0–10% $TiO_2$, 0–25% ZnO, and 0–10% $ZrO_2$. The preferred base compositions consisted essentially of 0.5–12% $Li_2O$, 0–10% $Na_2O$, 0.5–14% $Li_2O+Na_2O$, 14–38% MgO, 0–15% $B_2O_3$, 0–10% $Al_2O_3$, 35–70% $SiO_2$, and 5–15% F. The glass-ceramic bodies prepared from the above composition intervals contained crystals selected from the group of fluorhectorite, boron fluorphlogopite, and solid solutions between those and between those and other structurally-compatible species selected from the group of talc, fluortalc, polylithionite, fluorpolylithionite, phlogopite, and fluorphlogopite. The above-described glass-ceramic body was contacted with a polar liquid, desirably water, to cause swelling and disintegration of the body accompanied with the formation of a gel. The solid-liquid ratio of the gel was adjusted to a desired fluidity depending upon the geometry of the ultimate article to be formed. The desired article was formed and then contacted with a source of large cations (most frequently a water solution thereof) to effect an ion exchange reaction between those cations and the $Li^+$ and/or $Na^+$ ions from the interlayer of the mica crystals with accompanying flocculation of the gel. Finally, the ion exchanged article was dried. The preferred large cations were selected from the group of $Ag^+$, $Ba^{+2}$, $Ca^{+2}$, $Cu^{+2}$, $Cs^+$, $K^+$, $NH_4^+$, $Pb^+$, $Rb^+$, $Sr^{+2}$, and certain organic polycations, specifically noting aniline hydrochloride and quaternary ammonium compounds. Hence, with the organic polycations as the substituting cations, the $Li^+$ and/or $Na^+$ ions present in the interlayer of the mica crystals are replaced with the organic polycations.

As is explained in U.S. Pat. No. 4,239,519, the crystals developed exhibit a morphology of a continuum of flakes, rectangular-like strips, and interwoven ribbons in parallel or sub-parallel zones or sheaths, with said flakes being irregularly shaped with diameters between about 0.5–10 microns and cross sections of less than 100Å, and said strips and ribbons being about 0.5–10 microns long, about 500–5000Å wide, and less than about 100Å thick. That morphology results in crystals demonstrating very high aspect ratios, higher than naturally-occurring micas, and large surface areas, both of those features serving to recommend their utility for reinforcing various matrices.

U. S. Pat. No. 4,454,237 discloses the preparation of an organic-inorganic composite body demonstrating hydrophobic behavior. The lithium and/or sodium waterswelling micas described in U. S. Pat. No. 4,239,519 comprised the starting materials, and the process utilized in preparing the body also followed that reported in that patent. The ion exchange reaction involved organic polycations selected from the group of aminosilanes and organic chrome complexes. As was observed in Hoda et al., only an amount of aminosilane and/or organic chrome complex sufficient to replace essentially all of the $Li^+$ and/or $Na^+$ ions in the interlayer of the mica will be employed.

U. S. Pat. No. 4,455,382 likewise discloses the preparation of an organic-inorganic composite body wherein the lithium and/or sodium water-swelling micas recorded in U. S. Pat. No. 4,239,519 comprise the starting materials and the process employed in preparing the body also followed that described in that patent. The ion exchange reaction involved organic polycations selected from the group of (a) a primary amine solubilized with acid, (b) a secondary amine solubilized with acid, (c) a tertiary amine solubilized with acid, (d) a quaternary ammonium acid salt, (e) a quaternary phosphonium acid salt, and (f) a ternary sulfonium acid salt. Again, only an amount sufficient to replace essentially all of the $Li^+$ and/or $Na^+$ ions in the interlayer of the mica will be utilized.

As can be appreciated, the concentration of the organic component is limited to that resulting from the replacement of $Li^+$ and/or $Na^+$ ions from the interlayer of the mica. Moreover, the operable organic species are restricted to organic cations.

SUMMARY OF THE INVENTION

The primary objective of our invention was to develop organic-inorganic composites demonstrating good insulating properties through the inclusion of an organic polymer exhibiting very low permittivity. Inasmuch as the series mode is the most efficient in reducing the permittivity of a body, our research was focussed on ceramic layered host bodies that can be processed to form multilayered structures with molecular periodicity. Accordingly, our invention was directed to the production of ceramic-based composites wherein the second phase is a low permittivity organic polymer. The ceramic/polymer composites combine the excellent properties of ceramics in terms of mechanical strength, coefficient of thermal expansion, and thermal stability, with the low dielectric characteristics and good processability of the organic polymer. Accordingly, in ceramic matrices highly filled with organic polymer, one can exploit the synergistic interactions between the ceramic and the polymer.

Fluorhectorite is a synthetic mica-type silicate with a layered lattice structure in which two-dimensional, multiple cross-linked planes of atoms are separated by layers of hydrated cations. The stacking of the layers to form crystals leads to the formation of interlayers or "galleries" in which the layers are held together by electrostatic and van der Waals forces. In fluorhectorite and other charged silicates, the galleries are occupied by hydrated cations which act to balance the charge deficiency that has been generated by the isomorphous substitution in the tetrahedral or octahedral sheets. The strong intraplanar, but weak interplanar, binding forces that arise from the two-dimensional structure allow the introduction (intercalation) of guest species into the galleries of the host crystal lattice.

Simple intercalative and/or ion exchange procedures permit a variety of organic species of virtually any size to be accommodated within the galleries of layered, synthetic mica-type silicates such as lithium fluorhectorite. Spectroscopic characterization of the intercalates has indicated that the properties of the gallery species are generally preserved on intercalation. Measurements have indicated that the average area per unit layer charge is approximately $28Å^2$ for synthetic-mica-type silicates, such that intercalating species with cross-sectional areas less than that value cannot fully cover the gallery surfaces, thereby resulting in a nanoporous structure.

Our invention is founded in the in situ intercalation and polymerization of a monomer into layered, synthetic mica-type silicates of the identities disclosed in U. S. Pat. No. 4,239,519 to yield bodies comprising a pseudo two-dimensional composite with nanometer architecture. The process contemplates exchanging the $Li^+$ and/or $Na^+$ ions from the interlayer of the fluorhectorite with ions of a transition metal having multiple oxidation states which are matched with the oxidation potential of the monomer. Contact of the monomer with the transition metal ions results in oxidative polymerization of the monomer. Such transition metals include copper, iron, ruthenium, and vanadium, with copper being the most preferred. Useful monomers include pyrrole and aniline with the latter being our most preferred organic monomer.

DESCRIPTION OF PREFERRED EMBODIMENTS

A glass-ceramic containing synthetic lithium fluorhectorite was prepared by heat treating a precursor glass consisting essentially, in parts by weight, of 6.2 $Li_2O$, 24 MgO, 60 $SiO_2$, and 10 F. (Because it is not known in what proportions fluoride is combined with the $Li^+$ and $Mg^{+2}$ ions, it is simply reported in terms of fluoride. Also, inasmuch as the sum of the four ingredients closely approximates 100, for all practical purposes the values can be deemed to represent weight percent.) The precursor glass body was heat treated at about 700° C. for about four hours to yield a highly crystalline, glass-ceramic body containing lithium fluorhectorite as the predominant crystal phase. The glass-ceramic body was comminuted and the resultant particles immersed into deionized water, whereupon it disintegrated and formed a gel. After occasional stirring, the material was allowed to settle and the gel decanted, leaving any residual glass and non-micaceous phases, if present. The gel was subsequently contacted with an aqueous 1M solution of $Cu(NO_3)_2$ to cause an ion exchange to occur between $Cu^{+2}$ ions from the $Cu(NO_3)_2$ solution and $Li^+$ ions from the interlayer of the fluorhectorite with accompanying flocculation of the gel. After washing the flocs several times with deionized water to remove excess $Cu(NO_3)_2$, a suspension of the flocs in deionized water was prepared.

Thin films of the $Cu^{+2}$ ion exchanged fluorhectorite were prepared by evaporating a suspension thereof on either a polyethylene plate (for self-supporting films) or on a glass substrate. Aniline in the vapor phase was intercalated into the films in a $P_2O_5$-containing desiccator. In general, the reaction was completed within 3-4 days. As can be observed, intercalation of aniline from the gaseous phase is relatively slow. Where the precursor films were immersed into neat aniline, a rapid color change occurred and intercalation was complete within 24 hours. (In contrast, no polymerization takes place when $Li^+$ ions are present in the galleries.)

Intercalation of aniline in $Cu^{+2}$ ion exchanged fluorhectorite results in oxidative polymerization to polyaniline (PANI). Chemical oxidation of aniline yields the emeraldine base form of polyaniline that consists of an equal number of amine [—($C_6H_4NH$)—] and quinoidal [—($C_6H_4NH$)—] repeating units. In contrast, when polymerization is carried out in acidic media, the protonated poly(semiquinone), a radical cation structure is formed. That form of polyaniline is electrically conducting and is believed to consist of equal numbers of reduced [—($C_6H_4NH$)—] and oxidized, protonated quinone [—($C_6H_4NH^+$)—] repeat units. For example, the conducting form of polyaniline can be produced by exposing the original polyaniline films to vapors of HCl followed by mild heating ($\approx 415°$ C.) to remove excess HCl. The in-plane conductivity of the composite film is 0.05 S/cm. Hence, where desired, a composite body exhibiting electrical conductivity can be formed.

The gallery $Cu^{+2}$ ions serve as oxidation centers for the oxidative polymerization of aniline in the intracrystalline environment of the host fluorhectorite structure. The reaction can be represented by the following equation wherein the horizontal lines denote the layered structure:

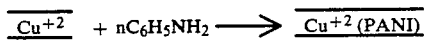

$$\overline{Cu^{+2}} + nC_6H_5NH_2 \longrightarrow \overline{Cu^{+2} \text{ (PANI)}}$$

X-ray diffraction patterns of the dried oriented films demonstrate that in situ intercalation/polymerization of aniline results in a highly ordered nanocomposite with a multilayered structure. Several (001) harmonics have been observed corresponding to a primary repeat unit (d spacing) of 14.9Å. A difference of 5.3Å from the corresponding 9.6Å for the silicate framework is in agreement with intercalation of single chains of polyaniline.

Additional evidence for the formation of polyaniline is gained from studying the electronic absorption spectra and infrared spectra exhibited by the dried samples. Thus, the electronic absorption spectrum shows a main absorption band at 510 nm (2.4 eV) which is characteristic of the insulating form of polyaniline. By way of comparison, the host fluorhectorite shows a characteristic absorption at 4.5 eV. The typical vibrations of polyaniline at 1595, 1490, 1305, and 1245 $cm^{-1}$ are observed in the infrared spectrum.

The relative permittivity for polyaniline intercalated fluorhectorite heated at 300° C. for two hours ranged from a dielectric constant (25° C.) of about 5.6 at 100 Hz to about 3.4 at $10^7$ Hz. The loss tangent was about 0.07. The measurements were performed under ambient laboratory conditions with no specific attempt being made to exclude humidity. The dielectric properties remained essentially unchanged after exposure of the films to the ambient atmosphere for in excess of one month.

Dielectric measurements conducted on unheated samples demonstrated higher dielectric constant and loss tangent values; such increases being conjectured as arising from the presence of small amounts of water and/or unreacted monomer in the galleries. The composite films displayed excellent thermal stability up to 700° C. That is, after an initial weight loss of approximately 3%, presumably due to residual monomer trapped during the reaction and/or adsorbed atmospheric moisture, there is no further weight loss up to 700° C.

We claim:

1. An electrically insulating organic-inorganic composite body consisting essentially of lithium and/or sodium water-swelling mica crystals selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, wherein the $Li^+$ and/or $Na^+$ ions from the interlayer of said lithium and/or sodium water-swelling mica crystals have been exchanged with ions of a transition metal having multiple oxidation states, the galleries of said crystals containing said ions of a transition metal and a very low permittivity organic polymer.

2. A composite body according to claim 1 wherein said lithium and/or sodium water-swelling mica consists essentially, in weight percent, of

| | | | |
|---|---|---|---|
| $Li_2O$ | 0–12 | $Al_2O_3$ | 0–10 |
| $Na_2O$ | 0–10 | $SiO_2$ | 35–70 |
| $Li_2O + Na_2O$ | 0.5–14 | F | 0–15 |
| MgO | 10–38 | OH | 0–15 |
| $B_2O_3$ | 0–30 | F + OH | 4–15. |

3. A composite body according to claim 1 wherein said lithium and/or sodium water-swelling mica consists essentially, in weight percent, of

| | | | |
|---|---|---|---|
| $Li_2O$ | 0.5–12 | $B_2O_3$ | 0–15 |
| $Na_2O$ | 0–10 | $Al_2O_3$ | 0–10 |
| $Li_2O + Na_2O$ | 0.5–14 | $SiO_2$ | 35–70 |
| MgO | 14–38 | F | 5–15. |

4. A composite body according to claim 3 wherein said water-swelling mica is a lithium fluorhectorite.

5. A composite body according to claim 1 wherein said transition metal is selected from the group consisting of copper, iron, ruthenium, and vanadium.

6. A composite body according to claim 1 wherein said organic polymer exhibiting very low permittivity is the emeraldine base form of polyaniline.

7. An electrically conductive organic-inorganic composite body consisting essentially of lithium and/or sodium water-swelling mica crystals selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, wherein the $Li^+$ and/or $Na^+$ ions from the interlayer of said lithium and/or sodium water-swelling mica crystals have been exchanged with ions of a transition metal having multiple oxidation states, the galleries of said crystals containing said ions of a transition metal and an electrically conductive organic polymer.

8. A composite body according to claim 7 wherein said lithium and/or sodium water-swelling mica consists essentially, in weight percent, of

| | | | |
|---|---|---|---|
| $Li_2O$ | 0–12 | $Al_2O_3$ | 0–10 |
| $Na_2O$ | 0–10 | $SiO_2$ | 35–70 |
| $Li_2O + Na_2O$ | 0.5–14 | F | 0–15 |
| MgO | 10–38 | OH | 0–15 |
| $B_2O_3$ | 0–30 | F + OH | 4–15. |

9. A composite body according to claim 8 wherein said lithium and/or sodium water-swelling mica consists essentially, in weight percent, of

| | | | |
|---|---|---|---|
| $Li_2O$ | 0.5–12 | $B_2O_3$ | 0–15 |
| $Na_2O$ | 0–10 | $Al_2O_3$ | 0–10 |
| $Li_2O + Na_2O$ | 0.5–14 | $SiO_2$ | 35–70 |
| MgO | 14–38 | F | 5–15. |

10. A composite body according to claim 8 wherein said water-swelling mica is a lithium fluorhectorite.

11. A composite body according to claim 7 wherein said transition metal is selected from the group consisting of copper, iron, ruthenium, and vanadium.

12. A composite body according to claim 7 wherein said organic polymer exhibiting electrical conductivity is the protonated poly(semiquinone) form of polyaniline.

13. A composite body according to claim 1 wherein the galleries of said crystals have an average area per unit layer charge of approximately 28Å$^2$ and the surfaces thereof are covered with said organic polymer.

14. A composite body according to claim 7 wherein the galleries of said crystals have an average area per unit layer charge of approximately 28Å$^2$ and the surface thereof are covered with said organic polymer.

* * * * *

UNITED STATES PATENT AND TRADEMARK OFFICE
CERTIFICATE OF CORRECTION

PATENT NO. : 5,032,547
DATED : July 16, 1991
INVENTOR(S) : Giannelis et al

It is certified that error appears in the above-identified patent and that said Letters Patent is hereby corrected as shown below:

Claim 3, line 15, column 6, "claim 1" should be --claim 2--.

Claim 14, line 7, column 8, "surface" should be --surfaces--.

Signed and Sealed this

Fifth Day of January, 1993

Attest:

DOUGLAS B. COMER

*Attesting Officer*　　Acting Commissioner of Patents and Trademarks